United States Patent [19]
Landry

[11] Patent Number: 5,397,160
[45] Date of Patent: Mar. 14, 1995

[54] VEHICLE CONSOLE

[76] Inventor: Richard P. Landry, 1347 Fountain, Troy, Mich. 48098

[21] Appl. No.: 100,756

[22] Filed: Aug. 2, 1993

[51] Int. Cl.⁶ .............................................. B60R 11/02
[52] U.S. Cl. ................................... 296/37.8; 224/273
[58] Field of Search .................. 296/37.1, 37.8, 37.14, 296/37.16; 224/273, 42.42

[56] References Cited

U.S. PATENT DOCUMENTS

| | | | |
|---|---|---|---|
| 4,087,126 | 5/1978 | Wynn | 296/37.8 |
| 4,371,138 | 2/1983 | Roberts | 224/273 X |
| 4,890,970 | 1/1990 | Willits | 296/37.1 X |
| 4,940,275 | 7/1990 | Miki et al. | 296/37.8 |

FOREIGN PATENT DOCUMENTS

| | | | |
|---|---|---|---|
| 2677592 | 12/1992 | France | 224/273 |
| 3530654 | 3/1987 | Germany | 224/273 |
| 242751 | 10/1988 | Japan | 224/273 |
| 4063739 | 2/1992 | Japan | 296/37.8 |
| 5000641 | 1/1993 | Japan | 224/273 |
| 8807460 | 10/1988 | WIPO | 224/273 |

OTHER PUBLICATIONS

J. C. Whitney & Co. Catalog No. 539A (Feb. 1992), p. 85.

*Primary Examiner*—Dean J. Kramer
*Attorney, Agent, or Firm*—Brooks & Kushman

[57] ABSTRACT

A vehicle console (18) has a housing (22) including an upper compartment (30) with mounting portions (48,50,52) for mounting a video unit (32) in an inclined orientation. A screen (34) of the video unit is observed through an opening (46) in a rear end (38) of an upper compartment closure (36). The inclined mounting of the video unit (32) causes it to load a connection (40) of the upper closure (36) without excessively loading a latch (44) thereof upon abrupt vehicle deceleration. A ratchet and strap assembly (98) provides for convenient securement of the console and includes a ratchet (100) and a strap (102) having connectors (108) for attaching the strap to the vehicle whereupon the strap is tightened by the ratchet. The console housing (22) also includes a lower compartment (78) for an operating unit for the video unit (32) as well as including upper and intermediate forward compartments (82,84) and a rear intermediate compartment (94).

23 Claims, 4 Drawing Sheets

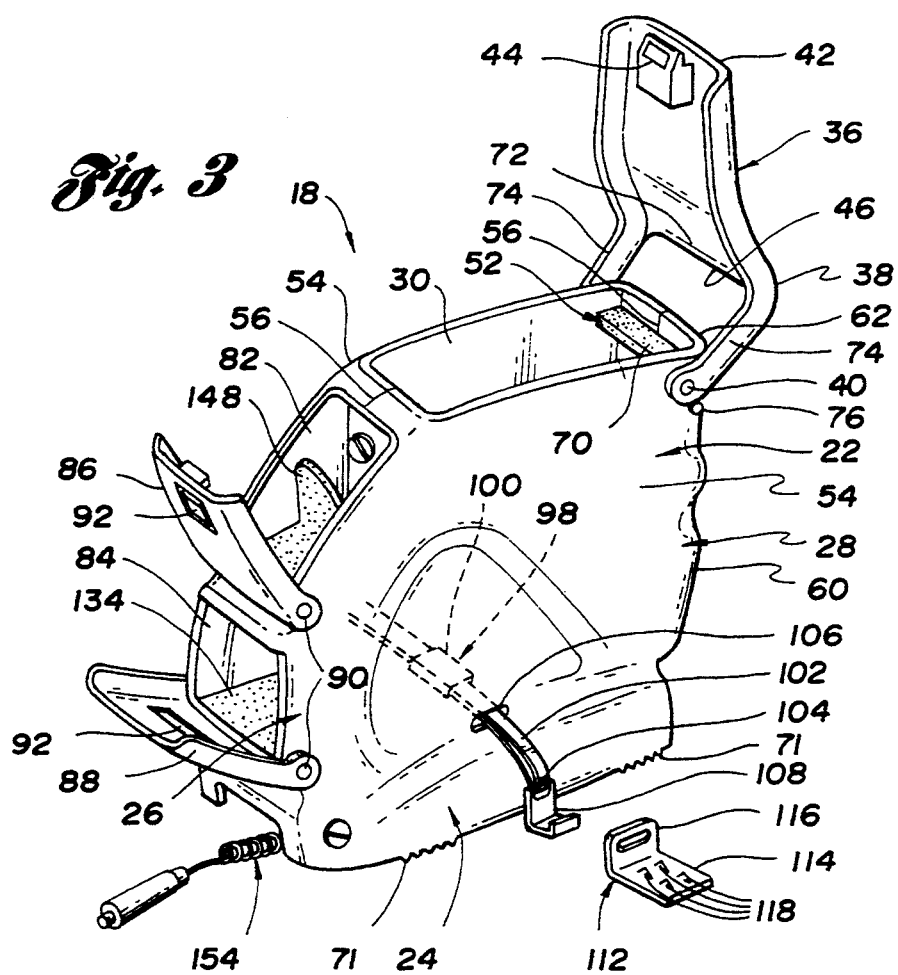
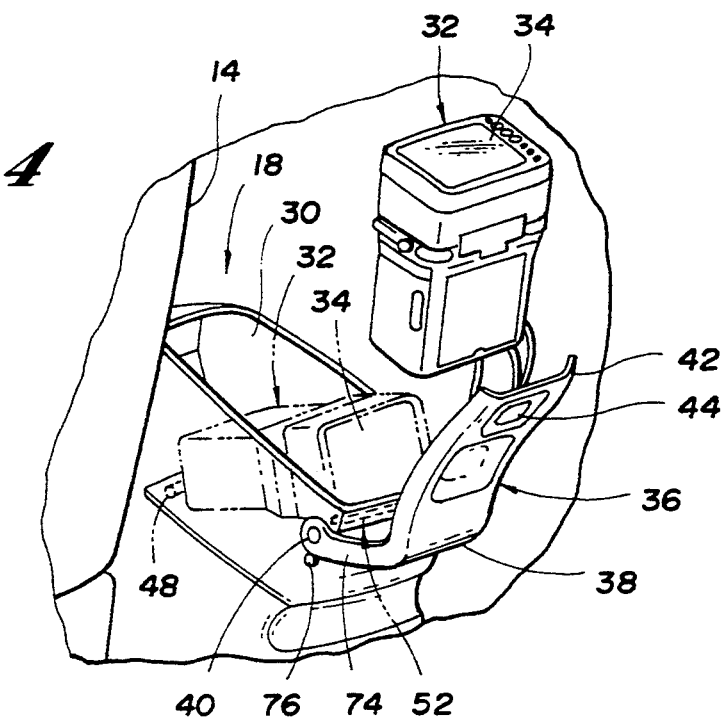

VEHICLE CONSOLE

TECHNICAL FIELD

This invention relates to a vehicle console for mounting within a vehicle occupant compartment to support a video unit having a screen that can be viewed for entertainment purposes.

BACKGROUND ART

There has not been to date any convenient way to utilize video units such as televisions or electronic game monitors within a vehicle. As such, such video units have normally previously been manually held or otherwise positioned without any securement to prevent movement upon abrupt vehicle deceleration. Likewise, there is no way to effectively position and secure an operating unit such as a video cassette recorder utilized with a television or an electronic game utilized with a monitor. While televisions and monitors have previously been fitted to full size conversion vans, this requires a rather major change in the headliner and wiring systems. The televisions and monitors become permanent within the van and lose the versatility of being easily and quickly removable for use in the home, etc. Also, such van conversion installations of televisions and monitors require complicated installation procedures which are time consuming.

DISCLOSURE OF INVENTION

An object of the present invention is to provide a vehicle console for effectively mounting a video unit within a vehicle occupant compartment.

In carrying out the above object, a vehicle console according to the invention is constructed to provide mounting thereof within a vehicle occupant compartment and has particular utility when mounted between the two front seats of a van type vehicle. A housing of the console has a lower mounting end for mounting the console which has an upwardly projecting shape extending upwardly from the lower mounting end. The upwardly extending shape of the console has front and rear ends as well as an upper compartment for receiving a video unit having a screen. An upper compartment closure of the console has a rear end including a connection for mounting thereof on the rear end of the housing for movement of the upper compartment closure between open beyond closed positions. The upper compartment closure has a front end including a latch for selectively securing the upper compartment closure in the closed position. The rear end of the upper compartment closure also has an opening through which the screen of the video unit can be viewed with the upper compartment closure in the closed position. Mounting portions of the upper compartment are also provided for mounting the video unit in an inclined orientation such that the video unit is restrained from inertial movement by the connection of the rear end of the upper compartment closure upon abrupt vehicle deceleration without excessively loading the latch.

In the preferred construction of the vehicle console, the housing has a pair of housing members having a longitudinal junction extending vertically between the front and rear ends of the housing. Each housing member has an associated one of said mounting portions. The housing also has an upper floor that defines the floor of the upper compartment and constitutes another one of said mounting portions. The rear end of the housing also includes a rear wall having an upper end that has a further one of said mounting portions.

The preferred construction of the vehicle console also has the rear end of the upper compartment closure constructed to include a horizontally extending portion having opposite lateral sides. The rear end of the upper compartment closure also includes a pair of legs that respectively extend from the opposite lateral sides of the horizontally extending portion to the connection thereof to the housing. The horizontally extending portion of the rear end of the upper compartment closure and the legs thereof cooperate to define the opening through which the screen of the video unit can be viewed with the upper compartment closure in its closed position. Most preferably, the pair of legs of the rear end of the upper compartment closure are located externally of the rear end of the housing which is located between the legs.

In its preferred construction, the housing of the console also includes a stop that limits the extent of opening movement of the upper compartment closure such that the video unit screen cannot be viewed from the rear of the console without the upper compartment closure in its closed position.

The preferred construction of the housing of the vehicle console also includes a lower compartment for receiving an operating unit for operating the video unit. Most preferably, the lower compartment is located within the lower mounting end of the housing and has a rearwardly facing opening for receiving the operating unit that operates the video unit. Furthermore, the housing of the vehicle console also preferably includes at least one forward compartment having an associated closure mounted on the housing for movement between open and closed positions. In addition, the housing also preferably includes a rearward intermediate compartment located between the upper compartment and the lower compartment. In the disclosed construction, the housing includes upper and intermediate forward compartments with each forward compartment having a respective closure mounted on the housing for movement between open and closed positions. Furthermore, the housing as previously mentioned includes a rearward intermediate compartment which is located between the upper compartment and the lower compartment to the rear of the upper and intermediate forward compartments.

The vehicle console also includes a ratchet and strap assembly for securing the console within a vehicle. The ratchet and strap assembly includes a ratchet that is received within the housing, a strap that extends from the ratchet and has oppositely extending extremities that project outwardly from the housing, and a pair of connectors for respectively securing the oppositely extending extremities of the strap to the vehicle. Each connector most preferably has a hook-shaped construction. For certain vehicles, the hook-shaped connectors can be secured directly to vehicle seats. In other vehicles, it is preferable for the vehicle console to include a pair of securement brackets that are secured to the vehicle to respectively provide for connection of the pair of connectors of the ratchet and strap assembly. Each securement bracket most preferably has an L-shaped configuration including a first leg that is secured to the vehicle and a second leg to which the associated strap connector is secured. The first leg of each securement bracket most preferably includes retainers for securing the bracket to the vehicle without the necessity of drilling any holes in the vehicle.

The vehicle console has its housing as disclosed constructed to include a movable door that has a use position partially defining the upper compartment and an access position that allows manual access to the ratchet for tightening of the strap to secure the console to the vehicle. After such tightening, the door is moved back to its use position and the video unit is positioned within the upper compartment prior to closing of the upper compartment closure and securement thereof by its latch.

The housing of the vehicle console preferably includes a lower floor that defines the upper confines of the lower compartment within the lower mounting end of the housing. The housing as previously mentioned has a rear opening through which an operating unit is received by the lower compartment to operate the video unit. The housing further includes a vertical wall extending upwardly from the lower floor intermediate the front and rear ends of the housing. The housing as also previously mentioned includes a pair of housing members having the longitudinal junction extending vertically between the front and rear ends of the housing. The lower floor and the vertical wall have connections to each of the housing members to provide securement thereof to each other. The housing also includes a front upper floor extending forwardly from the vertical wall and cooperating with the lower floor and the front end of the housing to define the upper and intermediate forward compartments previously mentioned. A rear upper wall of the housing is located rearwardly of the vertical wall and cooperates with the rest of the housing to define the upper compartment and the rearward intermediate compartment which is located between the upper compartment and the lower compartment to the rear of the upper and intermediate forward compartments.

Another object of the present invention is to provide an improved video console for mounting within a vehicle occupant compartment and including a housing having a lower mounting end for mounting the console which has an upwardly projecting shape extending upwardly from the lower mounting end. The upwardly extending shape of the console has front and rear ends as well as an upper compartment for receiving a video unit having a screen that can be viewed from the rear of the console. A ratchet and strap assembly of the console includes a ratchet that is received by the housing and a strap that extends from the ratchet and has opposite extremities that project outwardly from the housing. A pair of connectors respectively secure the oppositely extending extremities of the strap to the vehicle to secure the console as the strap is tightened by the ratchet.

The objects, features and advantages of the present invention are readily apparent from the following detailed description of the best mode for carrying out the invention when taken in connection with the accompanying drawings.

BRIEF DESCRIPTION OF THE DRAWINGS

FIG. 3 is a perspective view of the console looking downwardly and rearwardly from an upper left location and illustrating the console with closures thereof shown in an open position;

FIG. 4 is a partial perspective view that shows the manner in which a video unit such as the television shown is inserted into the console for use;

BEST MODE FOR CARRYING OUT THE INVENTION

Figure 1:
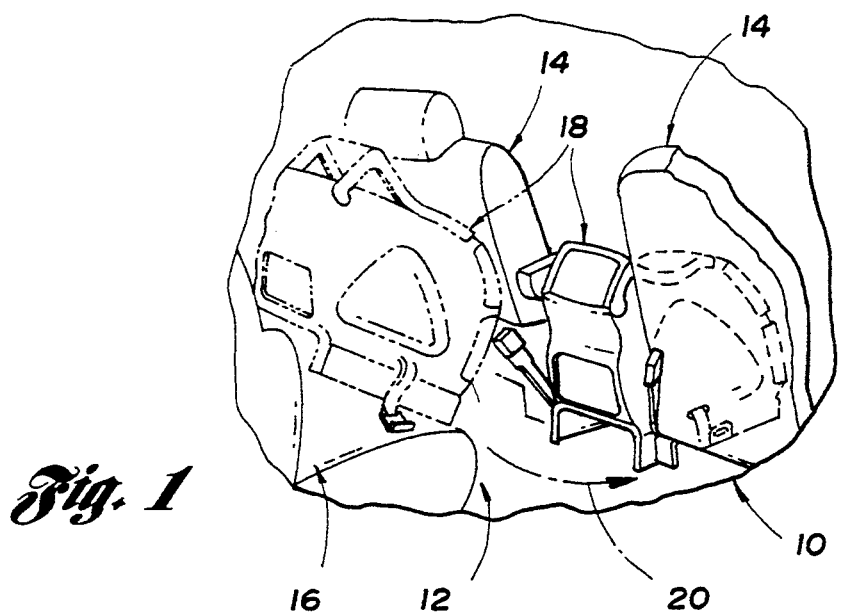
FIG. 1 is a partial perspective view of the interior of a vehicle within its occupant compartment and illustrates by solid line representation the mounted position of a console according to this invention between a pair of seats after movement thereto from the phantom line indicated position.

With reference to FIG. 1 of the drawings, a partially indicated vehicle 10 has its vehicle occupant compartment 12 illustrated with a pair of laterally spaced seats 14 located forwardly of another seat 16. Between the laterally spaced seats 14, a vehicle console 18 constructed in accordance with the present invention is mounted. This mounting of the vehicle console 18 is performed by moving the console from the phantom line indicated position to the rear of seats 14 downwardly and forwardly as shown by arrow 20 to the mounted position illustrated where securement is provided as is hereinafter more fully described.

Console 18 has provision for mounting a video unit such as a television or a video monitor having a screen that can be viewed from the rear seat 16. In addition as is hereinafter more fully described, the console 18 has provision for mounting of an operating unit for the video unit, such as a video cassette recorder for the television or a video game unit for a monitor.

Figure 2:
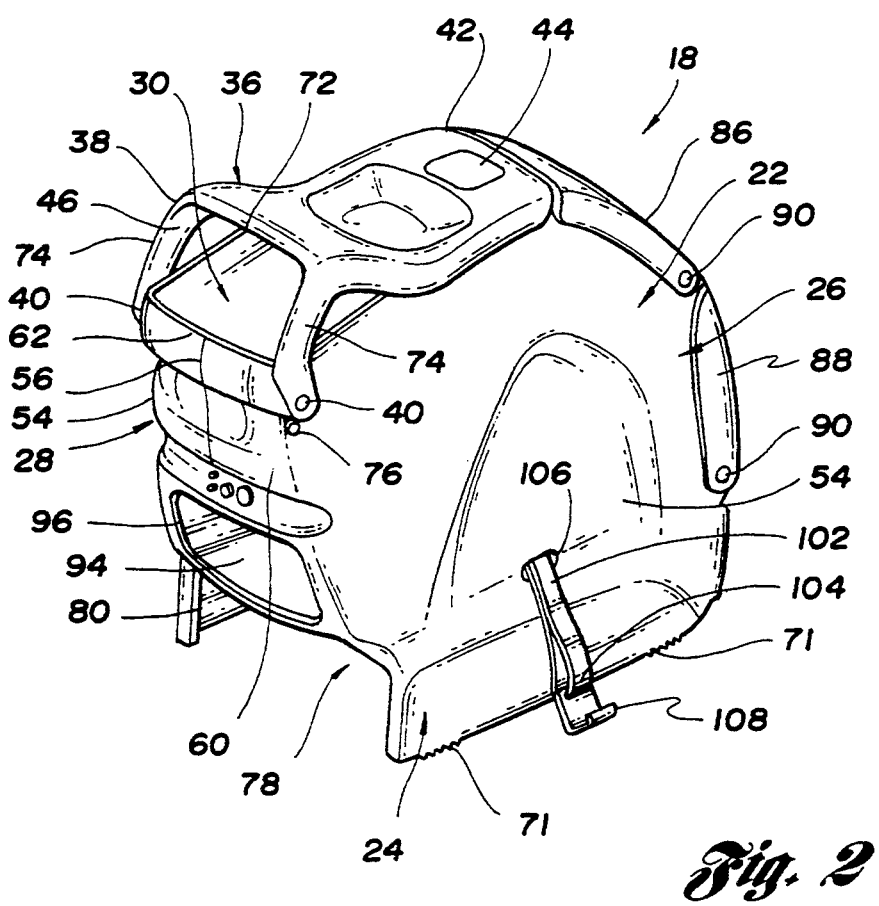
FIG. 2 is a perspective view of the console looking downwardly and forwardly from an upper right rear location.

With additional reference to FIG. 2, the vehicle console 18 includes a housing 22 having a lower end 24 for mounting the console which has an upwardly projecting shape extending upwardly from the lower mounting end. The upwardly extending shape of the console 18 has front and rear ends 26 and 28 as well as an upper compartment 30 which, as shown in FIG. 4, receives a video unit 32 having a screen 34. This video unit 32 can be a television as illustrated which can be used with an operating unit such as a video cassette recorder. Likewise, the video unit 32 can also be a monitor that is operated by a video game unit that functions as an operating unit for the monitor.

As illustrated by combined reference to FIGS. 2, 3 and 4, the console 18 includes an upper compartment closure 36 having a rear end 38 including a connection 40 for mounting of the closure on the rear end 28 of the housing for movement preferably in a pivotal manner between the open position shown in FIGS. 3 and 4 and the closed position shown in FIG. 2. The upper compartment closure 36 has a front end 42 including a latch 44 for selectively securing the upper compartment closure in the closed position of FIG. 2. Latch 44 is also selectively releasable in order to permit movement of the upper compartment closure 36 to the open position of FIG. 4 for insertion or removal of the video unit 32 into or from the upper compartment 30. The rear end 38 of the upper compartment closure 36 has an opening 46 through which the screen of the video unit can be viewed with the upper compartment closure in the closed position.

Figure 6:
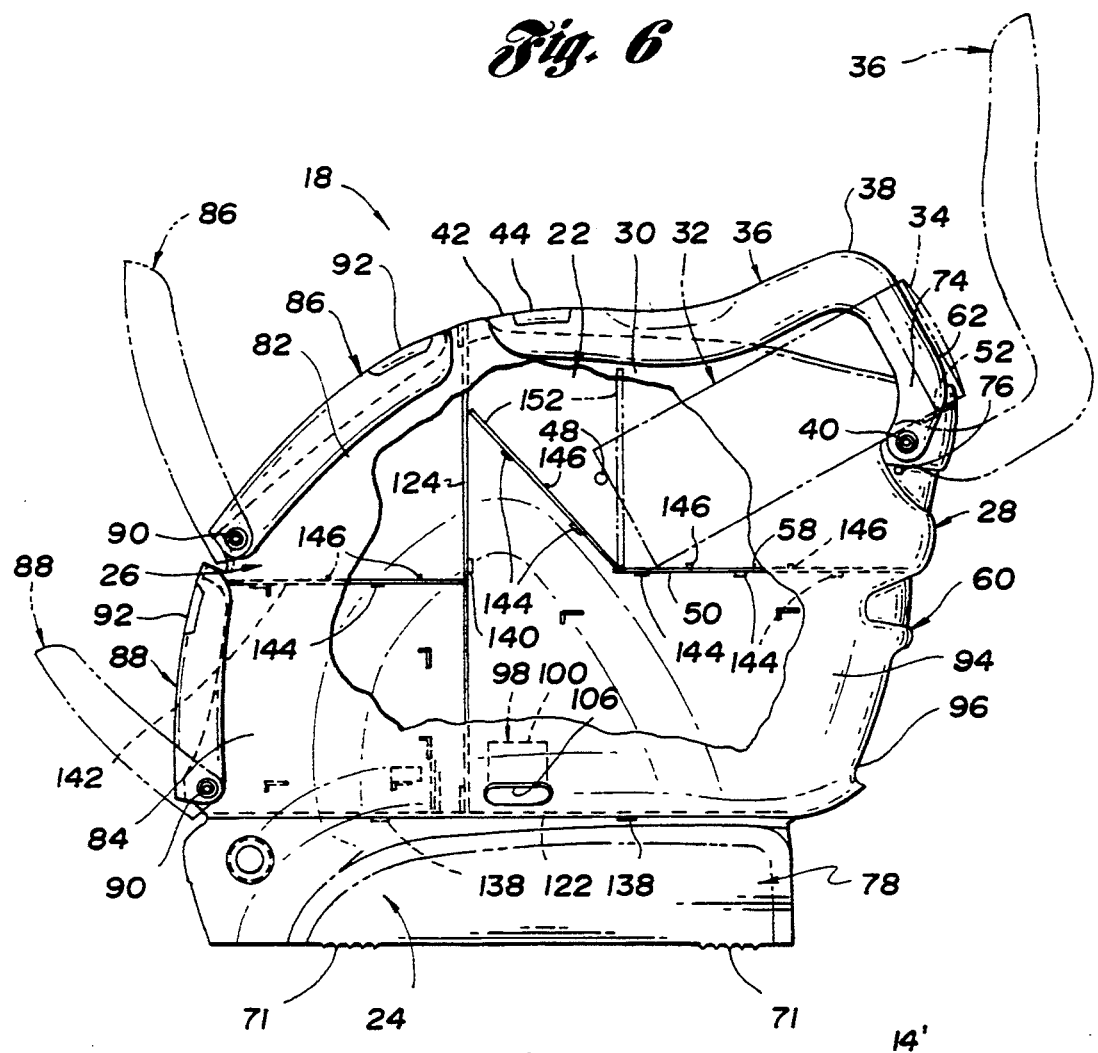
FIG. 6 is an elevational view taken longitudinally partially in section through the console along a central location with the video unit illustrated mounted therein for use.

As illustrated in FIG. 6, the upper compartment has mounting portions 48, 50 and 52 for mounting the video unit 32 in an inclined orientation. As such, abrupt vehicle deceleration causes the video unit 32 to tend to pivot counterclockwise about its forward end supported by the mounting portions 48 and 50. Such inertial movement is restrained by the rear end 38 of the upper compartment closure 36 by the connection 40 thereof to the rear end 28 of the housing without excessively loading the latch 44 that secures the front end 42 of the upper compartment closure in the closed position.

Figure 5:
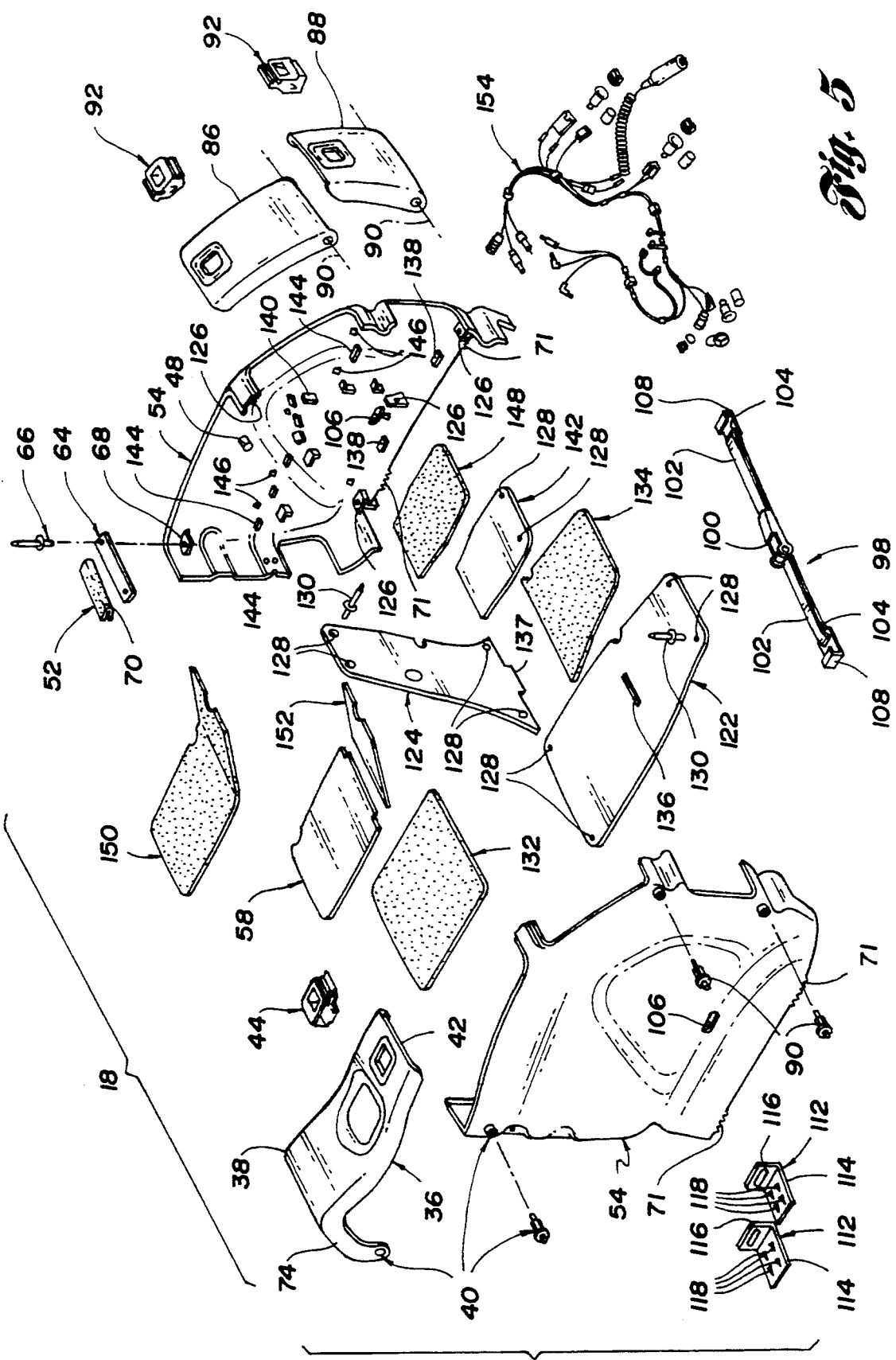
FIG. 5 is an exploded perspective view of the console.

As best illustrated by combined reference to FIGS. 2, 3 and 5, the console housing 22 has a pair of housing members 54 which have a longitudinal junction 56 extending vertically between the front and rear ends 26 and 28 of the housing. Each of these housing members 54 has one of the mounting portions 48 which engages the video unit 32 as shown in FIG. 6 adjacent its upper left extremity which constitutes the forward end of the video unit with respect to the vehicle but the rearward extremity of the video unit with respect to its normal orientation of use. The console housing 22 also includes an upper floor 58 that defines the floor of the upper compartment 30 and constitutes one of the mounting portions 50 that engages the lower extremity of the inclined video unit 32. The rear end of the housing 22 includes a rear wall 60 having an upper end 62 that has a further one of the mounting portions 52 that supports the video unit 32 adjacent the lower extremity of its screen 34. This mounting portion 52 as shown in FIG. 5 also cooperates with other components of the housing in securing the housing members 54 to each other. More specifically, the mounting portion 52 includes a connector strap 64 whose opposite ends are apertured to receive a fastener 66 that provides securement thereof to an apertured connector lug 68 at the associated upper rear corner of the housing member. The fastened strap is covered by a pad 70 on which the video unit rests. Each housing member 54 at the lower mounting end has teeth 71 that grip the vehicle carpet to prevent shifting of the console in cooperation with other securement apparatus hereinafter described.

With reference to FIG. 2, the rear end 38 of the upper compartment closure 30 includes a horizontally extending portion 72 having opposite lateral sides and also includes a pair of legs 74 that respectively extend downwardly from these opposite lateral sides to the connection 40 thereof to the housing 22. The horizontally extending portion 72 of the rear end 38 of the upper compartment 36 and the legs 74 thereof cooperate to define the opening 46 through which the screen of the video unit can be viewed with the upper compartment closure in its closed position. In the preferred construction, the pair of legs 74 of the rear end 38 of the upper compartment closure 36 are located externally of the rear end 28 of the housing which is located between the legs.

As best illustrated in FIGS. 2, 4 and 6, the housing 22 includes a stop 76 that limits the extent of opening movement of the upper compartment closure 36 such that the video unit screen cannot be viewed from the rear of the console without the upper compartment closure in its closed position. More specifically, the stop 76 is formed as a laterally projecting component just below the pivotal connection 40 at each leg 74 of the upper compartment closure rear end 38. Opening movement of the upper compartment closure to the open position of FIG. 4 causes the stop 76 to engage the adjacent leg 74 and limit further pivoting rotation thereof such that the upper compartment closure then blocks the video unit screen 34 until it is moved to the closed position where the latch 44 provides securement as previously described.

As best illustrated in FIGS. 1, 2 and 6, the vehicle console 18 has its housing 22 constructed to include a lower compartment 78 for receiving an operating unit for operating the video unit mounted by the console. More specifically, this lower compartment 78 is floorless such that the operating unit rests on the vehicle floor on which the lower end 24 of the console is mounted. The lower compartment 78 is thus located within the lower mounting end of the housing 22 and has a rearwardly facing opening 80 for receiving the operating unit that operates the video unit. This operating unit will normally be a video cassette recorder when the video unit is a television and will normally be an electronic game unit when the video unit is a monitor designed for video games.

As best illustrated in FIG. 3, the console housing 22 preferably also includes at least one forward compartment and most preferably includes upper and intermediate forward compartments 82 and 84 that may be utilized to store video or game tapes or any other items to be stored. Each of the upper and intermediate forward compartments 82 and 84 has an associated closure 86,88. Each of these closures 86, 88 has an associated pivotal connection 90 at its lower extremity for providing mounting thereof or movement between the open position shown in FIG. 3 and the closed position shown in FIG. 4 where an associated latch 92 secures the closure. It should also be noted as shown in FIG. 6 that the closures 86 and 88, as well as closure 36, extend over the housing 22 in their closed positions to prevent any misalignment with the housing.

As illustrated in FIG. 2, the console 18 also has its housing 22 constructed to include a rearward intermediate compartment 94 located between the upper compartment 30 and the lower compartment 78. This rearward intermediate compartment 94 is illustrated as having an opening 96 through which items may be inserted and removed from the housing for storage or use.

With reference to FIG. 5, the vehicle console 18 includes a ratchet and strap assembly 98 for securing the console within the vehicle. More specifically, the ratchet and strap assembly includes a ratchet 100 that is received within the housing 22 as shown in FIG. 6. A strap 102 extends from the ratchet 100 and has oppositely extending extremities 104 that project outwardly through respective housing slots 106. A pair of connectors 108 are respectively attached to the pair of strap extremities 104 to provide securement of the strap to the vehicle. Ratchet 100 has a spool and handle construction with the handle being stroked to wind the strap 102 around the spool in order to provide shortening thereof and consequent tightening of the strap in order to secure the console. The strap tightening pulls the console downwardly so the housing teeth 71 engage the vehicle carpet to prevent shifting during abrupt vehicle deceleration.

Figures 7, 8:
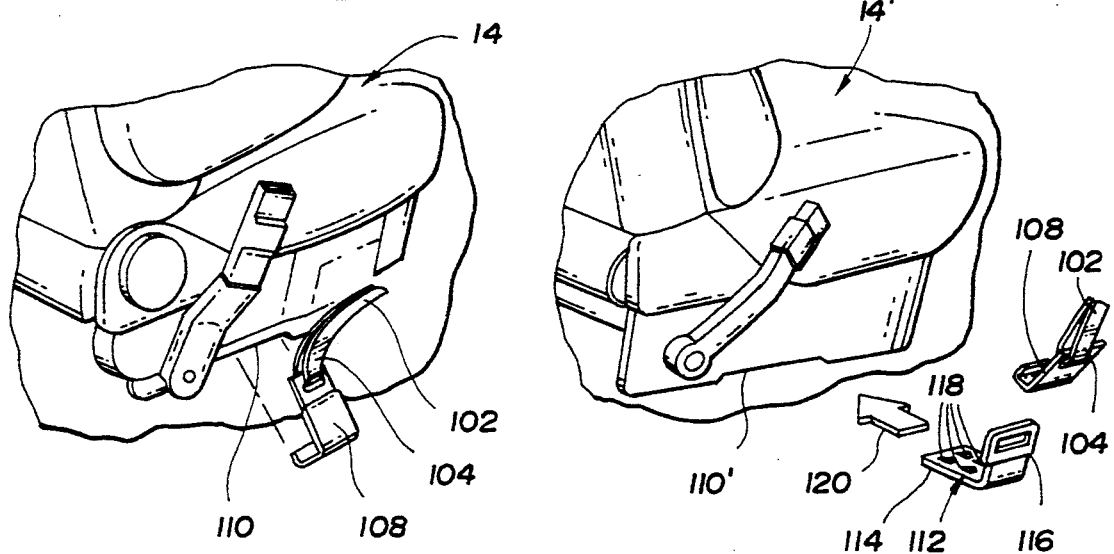
FIG. 7 is a partial view that illustrates one manner in which a ratchet strap connector is secured directly to a vehicle seat for use in securing the console.
FIG. 8 is a partial view that illustrates the manner in which a securement bracket is secured to another type of vehicle seat for use in securing a ratchet strap connector for securing the console.

As illustrated in FIGS. 2 and 3, the ratchet and strap assembly connectors 108 preferably have a hook-shaped construction that is utilized to secure the console to the vehicle. This securement can be provided in different ways such as illustrated in FIGS. 7 and 8. More specifically with reference to FIG. 7, in certain vehicles, the seat 14 has a frame 110 to which the connector 108 can be merely hooked for securement and tightening of the strap 102 by the ratchet in order to provide the securement of the console in position. As illustrated in FIG. 8, another type of seat 14′ requires a pair of securement brackets 112 that are secured to the vehicle at the seat to provide for connection of the pair of connectors 108 of the ratchet and strap assembly. Each securement bracket 112 preferably has an L-shaped configuration including a first leg 114 that is secured to the vehicle at the seat and also includes a second leg 116 which has a slotted construction to which the connector 108 is secured by hooking through this leg. More specifically, the first leg 114 of each bracket 112 preferably includes retainers 118 which are most preferably constructed as barbs for use in securing the bracket 112 to the vehicle without the necessity of drilling any holes in the vehicle. This securement is provided by moving the bracket 112 in the direction shown by arrow 120 so that the first leg 114 is moved below the seat frame 110′ whereupon the barb type retainers 118 are wedged under the seat frame to its opposite side to prevent removal of the bracket. Connector 108 of the ratchet and strap assembly is then hooked to the slotted second leg 116 of the secured bracket and the strap 102 is tightened by the ratchet to secure the console.

As illustrated by combined reference to FIGS. 5 and 6, the console housing 22 includes a lower floor 122 that defines the upper confines of the lower compartment 78 illustrated in FIG. 6. As previously mentioned, the housing 22 includes a rear opening 80 through which an operating unit is received by this lower compartment 78 to operate the video unit 32 which is mounted on an inclination as previously described to prevent inertial loading of the latch of the upper compartment closure 36. Housing 22 also includes a vertical wall 124 that extends upwardly from the lower wall 122 intermediate the front and rear ends 26 and 28 of the housing. The pair of housing members 54 as previously mentioned have a longitudinally extending junction 56 (FIG. 3) extending vertically between the front and rear ends of the housing. Both the lower floor 122 and the vertical wall 124 have connections to the housing members 54 to provide securement thereof to each other. More specifically, these connections are provided by apertured housing lugs 126, apertures 128 in both the lower floor 122 and the vertical wall 124, and fasteners 130 which can be rivets or screws, etc. that extend through the floor and wall apertures into the lug apertures to secure the upper floor and vertical wall into position. The securement of the vertical wall 124 substantially rigidifies the construction of the console by preventing sideway movement. Furthermore, front and rear pads 132 and 134 cover the lower floor 122 to the front and rear of the vertical wall 124 which may be interconnected to the lower floor by a slot 136 and projection 137 which provide a connection. Furthermore, additional support lugs 138 on each housing member 54 support the lateral edges of the lower floor 122 intermediate the apertured lugs 128 that are secured to its corners through the fastener connections previously described. Likewise, lugs 140 may be provided on the housing members 54 to further position the vertical wall 124 intermediate its upper and lower ends secured by the fastener connections previously described.

With continuing reference to FIGS. 5 and 6, the console housing also includes a front upper floor 142 extending forwardly from the vertical wall 124 and cooperating with the lower floor 122 and the front end of the housing to define the upper and intermediate forward compartments 82 and 84 previously described. As previously mentioned, the housing also includes a rear upper floor 58 located rearwardly of the vertical wall 124 and cooperating with the rest of the housing to define the upper compartment 30 and the rearward intermediate compartment 94 which is located between the upper compartment 30 and the lower compartment 78 to the rear of the upper and intermediate forward compartments 82 and 84. Both the upper rear wall 58 and the upper front wall 142 are supported by support lugs 144 at their lower edges and are secured in position by upper snap lugs 146. Furthermore, as illustrated in FIG. 5, front and rear upper pads 148 and 150 respectively cover the front upper wall 142 and the rear upper wall 58. Furthermore, the front upper wall 142 also has connection apertures 128 that are secured to respective apertured lugs on the pair of housing members 54 by the fasteners as previously described in connection with the lower floor 122 and the vertical wall 124.

As illustrated in FIGS. 5 and 6, the console housing also includes an upper door that has a solid line indicated use position as shown in FIG. 6 where it partially defines the upper compartment 30 in cooperation with the upper floor 58 and the rear end 26 of the housing. This door 152 is also movable to an access position as shown by phantom line representation in FIG. 6 to allow manual access to the ratchet 100 of the ratchet and strap assembly 98 for strap tightening that secures the console in position as previously described. More specifically, with the upper closure 36 in its open position, the open door 152 allows the assembler to reach down to the ratchet 100 and provide a stroking operation that winds the strap on the ratchet spool as previously described. Thereafter, the door 152 is moved back to its closed position where it can be secured by support and snap lugs 144 and 146 like the lugs that support the rear upper floor 58 and the front upper floor 142 as previously described. This movable door 152 is covered by the front end of the rear pad 150 as shown in FIG. 5.

With continuing reference to FIG. 5, the console also includes a cable assembly 154 which has suitable input and output connections for powering the video unit and any associated operating unit as well as having connections therebetween and an output for any additional power that may be needed or desired in connection with use of the console. Suitable connectors and the like are utilized to secure the cable assembly 154 within the housing with its cables extending along appropriate paths for connection as needed.

While the best mode for carrying out the invention has been described in detail, those familiar with the art to which this invention relates will recognize various alternative designs and embodiments for practicing the invention as defined by the following claims.

What is claimed is:

1. A vehicle console for mounting within a vehicle occupant compartment, comprising: a housing having a lower mounting end for mounting the console which has an upwardly projecting shape extending upwardly from the lower mounting end; the upwardly extending shape of the console having front and rear ends as well as an upper compartment for receiving a video unit having a screen; an upper compartment closure having a rear end including a connection for mounting thereof on the rear end of the housing for movement of the upper compartment closure between open and closed positions; the upper compartment closure having a front end including a latch for selectively securing the upper compartment closure in the closed position; the rear end of the upper compartment closure having an opening through which the screen of the video unit can be viewed with the upper compartment closure in the closed position; and the upper compartment having mounting portions for mounting the video unit in an inclined orientation such that the video unit is restrained from inertial movement by the connection of the rear end of the upper compartment closure upon abrupt vehicle deceleration without excessively loading the latch.

2. A vehicle console as in claim 1 wherein the housing has a pair of housing members having a longitudinal junction extending vertically between the front and rear ends of the housing, each housing member having an associated one of said mounting portions, the housing having an upper floor that defines the floor of the upper compartment and constitutes another one of said mounting portions, and the rear end of the housing including a rear wall having an upper end that has a further one of said mounting portions.

3. A vehicle console as in claim 1 wherein the rear end of the upper compartment closure includes a horizontally extending portion having opposite lateral sides, the rear end of the upper compartment closure including a pair of legs that respectively extend from the opposite lateral sides of the horizontally extending portion to the connection thereof to the housing, and the horizontally extending portion of the rear end of the upper compartment closure and the legs thereof cooperating to define the opening through which the screen of the video unit can be viewed with the upper compartment closure in its closed position.

4. A vehicle console as in claim 3 wherein the pair of legs of the rear end of the upper compartment closure are located externally of the rear end of the housing which is located between the legs.

5. A vehicle console as in claim 1 wherein the housing includes a stop that limits the extent of opening movement of the upper compartment closure such that the video unit screen cannot be viewed from the rear of the console without the upper compartment closure in its closed position.

6. A vehicle console as in claim 1 wherein the housing also includes a lower compartment for receiving an operating unit for operating the video unit.

7. A vehicle console as in claim 6 wherein the lower compartment is located within the lower mounting end of the housing and has a rearwardly facing opening for receiving the operating unit that operates the video unit.

8. A vehicle console as in claim 6 wherein the housing includes at least one forward compartment having an associated closure mounted on the housing for movement between open and closed positions.

9. A vehicle console as in claim 8 wherein the housing also includes a rearward intermediate compartment located between the upper compartment and the lower compartment.

10. A vehicle console as in claim 6 wherein the housing includes upper and intermediate forward compartments, and each forward compartment having a respective closure mounted on the housing for movement between open and closed positions.

11. A vehicle console as in claim 10 wherein the housing also includes a rearward intermediate compartment located between the upper compartment and the lower compartment to the rear of the upper and intermediate forward compartments.

12. A vehicle console as in claim 1 further including a ratchet and strap assembly for securing the console within the vehicle.

13. A vehicle console as in claim 1 wherein the ratchet and strap assembly includes a ratchet that is received within the housing, a strap that extends from the ratchet and has oppositely extending extremities that project outwardly from the housing, and a pair of connectors for respectively securing the oppositely extending extremities of the strap to the vehicle.

14. A vehicle console as in claim 13 wherein each connector has a hook-shaped construction.

15. A vehicle console as in claim 13 further including a pair of securement brackets that are secured to the vehicle to respectively provide for connection of the pair of connectors of the ratchet and strap assembly.

16. A vehicle console as in claim 15 wherein each securement bracket has an L-shaped configuration including a first leg that is secured to the vehicle and a second leg to which the associated strap connector is secured.

17. A vehicle console as in claim 16 wherein the first leg of each securement bracket includes retainers for securing the bracket to the vehicle without the necessity of drilling any holes in the vehicle.

18. A vehicle console as in claim 13 wherein the housing includes a movable door that has a use position partially defining the upper compartment and an access position that allows manual access to the ratchet for the tightening of the strap to secure the console to the vehicle.

19. A vehicle console as in claim 1 wherein the housing includes a lower floor that defines the upper confines of a lower compartment within the lower mounting end of the housing, and the housing having a rear opening through which an operating unit is received by the lower compartment to operate the video unit.

20. A vehicle console as in claim 19 wherein the housing further includes a vertical wall extending upwardly from the lower floor intermediate the front and rear ends of the housing.

21. A vehicle console as in claim 20 wherein the housing includes a pair of housing members having a longitudinal junction extending vertically between the front and rear ends of the housing, and the lower floor and the vertical walls having connections to each of the housing members to provide securement thereof to each other.

22. A vehicle console as in claim 20 further including a front upper floor extending forwardly from the vertical wall and cooperating with the lower floor and the front end of the housing to define upper and intermediate forward compartments, and a rear upper floor located rearwardly of the vertical wall and cooperating with the rest of the housing to define the upper compartment and a rearward intermediate compartment located between the upper compartment and the lower compartment to the rear of the upper and intermediate forward compartments.

23. A vehicle console for mounting within a vehicle occupant compartment, comprising: a housing having a lower mounting end for mounting the console which has an upwardly projecting shape extending upwardly from the lower mounting end; the upwardly extending shape of the console having front and rear ends as well as an upper compartment for receiving a video unit having a screen; an upper compartment closure having a rear end including a connection for mounting thereof on the rear end of the housing for movement of the upper compartment closure between open and closed positions; the upper compartment closure having a front end including a latch for selectively securing the upper compartment closure in the closed position; the rear end of the upper compartment closure having an opening through which the screen of the video unit can be viewed with the upper compartment closure in the closed position; the upper compartment having mounting portions for mounting the video unit in an inclined orientation such that the video unit is restrained from inertial movement by the connection of the rear end of the upper compartment closure upon abrupt vehicle deceleration without excessively loading the latch; the housing including a pair of housing members having a longitudinal junction extending vertically between the front and rear ends of the housing; each housing member having an associated one of said mounting portions; the housing having an upper floor that defines the floor of the upper compartment and constitutes another one of said mounting portions; the rear end of the housing including a rear wall having an upper end that has another one of said mounting portions; the rear end of the upper compartment closure including an upper horizontally extending portion having opposite lateral sides; the rear end of the upper compartment closure including a pair of legs that respectively extend from the opposite lateral sides of the horizontally extending portion to the connection thereof to the housing; the horizontally extending portion of the rear end of the upper compartment closure and the legs thereof cooperating to define the opening through which the screen of the video unit can be viewed; the housing including a lower floor that defines the upper confines of a lower compartment within the lower mounting end of the housing; the housing having a rear opening through which an operating unit is received by the lower compartment to operate the video unit; the housing further including a vertical wall extending upwardly from the lower floor intermediate the front and rear ends of the housing; and the lower floor and vertical wall having connections to each of the housing members to provide securement thereof to each other.

* * * * *